(12) United States Patent
Wakabayashi et al.

(10) Patent No.: US 12,068,648 B2
(45) Date of Patent: Aug. 20, 2024

(54) MOTOR

(71) Applicant: Sinfonia Technology Co., Ltd., Tokyo (JP)

(72) Inventors: Hiroki Wakabayashi, Tokyo (JP); Takakuni Iitsuka, Tokyo (JP); Yutaka Wakita, Tokyo (JP); Tetsuhiro Tomita, Tokyo (JP)

(73) Assignee: Sinfonia Technology Co., Ltd., Tokyo (JP)

( * ) Notice: Subject to any disclaimer, the term of this patent is extended or adjusted under 35 U.S.C. 154(b) by 427 days.

(21) Appl. No.: 17/617,656

(22) PCT Filed: Jun. 16, 2020

(86) PCT No.: PCT/JP2020/023505
§ 371 (c)(1),
(2) Date: Dec. 9, 2021

(87) PCT Pub. No.: WO2020/262093
PCT Pub. Date: Dec. 30, 2020

(65) Prior Publication Data
US 2022/0247248 A1    Aug. 4, 2022

(30) Foreign Application Priority Data
Jun. 25, 2019    (JP) .................... 2019-117635

(51) Int. Cl.
*H02K 3/24*    (2006.01)
*H02K 1/16*    (2006.01)
(Continued)

(52) U.S. Cl.
CPC ............... *H02K 3/24* (2013.01); *H02K 1/165* (2013.01); *H02K 1/20* (2013.01); *H02K 9/19* (2013.01); *H02K 2201/03* (2013.01)

(58) Field of Classification Search
CPC ............... H02K 1/20; H02K 3/24; H02K 9/19
See application file for complete search history.

(56) References Cited

U.S. PATENT DOCUMENTS

| | | | |
|---|---|---|---|
| 4,994,700 A | * | 2/1991 | Bansal ................ H02K 3/48 310/60 A |
| 6,515,384 B1 | | 2/2003 | Kikuchi et al. |

(Continued)

FOREIGN PATENT DOCUMENTS

| | | |
|---|---|---|
| CN | 103155382 A | 6/2013 |
| FR | 2823382 A1 | 10/2002 |

(Continued)

OTHER PUBLICATIONS

China Patent Application No. 2020800424500, Office Action, dated Dec. 29, 2023.

(Continued)

*Primary Examiner* — Gary A Nash
(74) *Attorney, Agent, or Firm* — Kilpatrick Townsend & Stockton LLP

(57) ABSTRACT

There is provided motor, including: a stator including a plurality of laminated plates; and a rotor arranged inside the stator with a gap between the rotor and the stator, wherein the stator further includes an annular yoke located outside of the stator and a plurality of teeth protruding from an inner peripheral surface of the yoke toward the rotor, wherein slots in which coils wound around the teeth are arranged are formed between the teeth that are adjacently arranged, wherein gaps to which a cooling medium is supplied are formed between bottom portions of the slots and the coils, and wherein the stator further includes end plate members arranged so as to face the laminated plates.

12 Claims, 14 Drawing Sheets

(51) Int. Cl.
*H02K 1/20* (2006.01)
*H02K 9/19* (2006.01)

(56) References Cited

U.S. PATENT DOCUMENTS

| | | | | |
|---|---|---|---|---|
| 6,653,758 | B2* | 11/2003 | Tsuneyoshi | H02K 9/197 310/216.014 |
| 8,970,073 | B2* | 3/2015 | Miyamoto | H02K 5/203 310/58 |
| 2011/0181136 | A1* | 7/2011 | Nakamori | H02K 3/24 310/54 |
| 2012/0080982 | A1 | 4/2012 | Bradfield | |
| 2014/0125165 | A1* | 5/2014 | Miyamoto | H02K 9/19 310/54 |
| 2014/0252893 | A1* | 9/2014 | Veeh | H02K 1/32 310/58 |
| 2015/0207387 | A1* | 7/2015 | Kudose | H02K 9/19 310/54 |
| 2017/0018991 | A1 | 1/2017 | Ludwig et al. | |
| 2017/0063201 | A1* | 3/2017 | Kitta | H02K 3/28 |

FOREIGN PATENT DOCUMENTS

| | | |
|---|---|---|
| GB | 191418281 A | 7/1915 |
| JP | 2001145302 A | 5/2001 |
| JP | 2004072812 A | 3/2004 |

OTHER PUBLICATIONS

International Patent Application No. PCT/JP2020/023505, Search Report (and English translation) and Written Opinion, dated Aug. 25, 2020.
Europe Patent Application No. 20830859.3, Extended European Search Report, dated Jun. 15, 2023.

* cited by examiner

MOTOR

CROSS-REFERENCE TO RELATED APPLICATIONS

This application is a national stage application of International Patent Application No. PCT/JP2020/023505, filed on Jun. 16, 2020, which claims priority to Japan Patent Application No. 2019-117635, filed on Jun. 25, 2019, both of which are hereby incorporated by reference in their entireties.

TECHNICAL FIELD

The present disclosure relates to an electric motor (motor, generator, etc.), and particularly to a stator cooling structure.

BACKGROUND

Conventionally, there is known a motor that includes a rotor, a tubular stator arranged around the rotor, and coils wound in the longitudinal direction of the stator, and the stator is supported inside a housing. The coils are arranged in the slots of the stator. A piping portion is provided so as to make contact with the outer peripheral side of the coil ends at the end portions of the coils.

A supply pipe is provided to penetrate the housing. When cooling oil as a refrigerant is supplied to the supply pipe, the supplied cooling oil flows through the piping section and is injected from an injection port. Therefore, as the cooling oil flows through the piping section to cool the piping portion, it is possible to cool the coil ends kept in contact with the piping portion. As the cooling oil injected from the injection port of the piping portion makes direct contact with the coil ends, it is possible to dissipate heat from the coil ends, thereby cooling the coil ends.

PRIOR ART DOCUMENT

Patent Document

Patent Document 1: Japanese laid-open publication No. 2004-72812

There is an increasing need for higher output or smaller size and lighter weight (higher output density) of a motor. The loss density (coil temperature) tends to increase in order to meet such a need. For example, in the cooling method disclosed in Patent Document 1, the coil ends can be cooled by the cooling oil injected from the injection port of the piping portion. However, the coils in the slots cannot be cooled and the cooling capacity is insufficient. Therefore, there is a problem that the temperature at the center of the coils in the slots is highest and the temperature rise in the coils exceeds a specified value.

Therefore, the present disclosure provides a motor capable of preventing the temperature rise in coils from exceeding a specified value even when the loss density of the motor increases.

The present disclosure adopts the following means in order to achieve such an object.

SUMMARY

According to one embodiment of the present disclosure, there is provided a motor, including: a stator including a plurality of laminated plates; and a rotor arranged inside the stator with a gap between the rotor and the stator, wherein the stator further includes an annular yoke located outside of the stator and a plurality of teeth protruding from an inner peripheral surface of the yoke toward the rotor, wherein slots in which coils wound around the teeth are arranged are formed between the teeth that are adjacently arranged, wherein gaps to which a cooling medium is supplied are formed between bottom portions of the slots and the coils, wherein the stator further includes end plate members arranged so as to face the laminated plates, and wherein one end portion of the gaps in at least one of the slots communicates with cooling medium supply paths formed between the end plate members and the laminated plates of the stator, and the other end portion of the gaps in the at least one of the slots is opened.

Thus, in the motor according to the present disclosure, the cooling medium supply paths are formed between the end plate members and the laminated plates of the stator, and the cooling medium is supplied to the gap in at least one of the slots from the cooling medium supply paths. Therefore, the coils in the slots are cooled by the cooling medium passing through the gaps in the slots. Accordingly, it is possible to effectively suppress the temperature rise in the central portions of the coils in the slots which have the highest temperature. Further, the coil ends are cooled as the cooling medium passing through the gap in at least one of the slots and then flowing out from the stator makes contact with the coil ends. Accordingly, even when the loss density of the motor increases, it is possible to prevent the temperature rise of the coils from exceeding a specified value.

In the motor according to the present disclosure, the cooling medium supply paths include: a first cooling medium supply path arranged on one end surface of the stator and configured to supply a cooling medium to the slots arranged on the other end side of the stator; and a second cooling medium supply path arranged on the other end surface of the stator and configured to supply a cooling medium to the slots arranged on one end side of the stator, wherein the cooling medium in the first cooling medium supply path flows toward the other end surface of the stator and then flows out from the other end surface of the stator, and wherein the cooling medium in the second cooling medium supply path flows toward the one end surface of the stator and then flows out from the one end surface of the stator.

By this way, in the motor according to the present disclosure, the cooling medium in the first cooling medium supply path flows from one end surface toward the other end surface of the stator, and the cooling medium in the second cooling medium supply path flows from the other end surface toward one end surface of the stator. Therefore, as compared with the case where the entire cooling medium flows in the same direction, the temperature of the coils can be made uniform in the axial direction of the stator. Further, as compared with the case where the entire cooling medium passed through the slots flows out toward one side of the stator, it is possible to reduce a difference between the amount of the cooling medium flowing out from one end surface of the stator and the amount of the cooling medium flowing out from the other end surface of the stator. Therefore, it is possible to easily recover the cooling medium flowing out from the stator.

In the motor according to the present disclosure, a number of the slots from which the cooling medium flows out on the other end surface of the stator is the same as a number of the slots from which the cooling medium flows out on the one end surface of the stator.

As a result, in the motor according to the present disclosure, the cooling occurring when the cooling medium in the first cooling medium supply path flows from one end surface toward the other end surface of the stator, and the cooling occurring when the cooling medium in the second cooling medium supply path flows from the other end surface to one end surface of the stator are substantially the same. Therefore, the temperature of the coils can be made more uniform in the axial direction of the stator. Further, the amount of the cooling medium flowing out from one end surface of the stator and the amount of the cooling medium flowing out from the other end surface of the stator can be made substantially the same.

The motor according to the present disclosure may further include: a first end plate member arranged on one end surface of the stator; and a second end plate member arranged on the other end surface of the stator, wherein one end portions of the coils are arranged on an opposite side of the first end plate member from the stator, and the other end portions of the coils are arranged on an opposite side of the second end plate member from the stator.

As a result, in the motor according to the present disclosure, the stator can be made small in size, as compared with the case where the cooling medium supply paths are formed so as to cover the entirety up to the coil ends.

In the motor according to the present disclosure, spacers configured to position the coils in the slots are arranged in a vicinity of the bottom portions in the slots, and the spacers include recess portions for forming the gaps in the slots.

As a result, in the motor according to the present disclosure, it is possible to prevent the coils from moving in the slots and to prevent the magnetic characteristics from being changed.

According to the present disclosure described above, it is possible to prevent the temperature rise in the coils from exceeding a specified value even when the loss density of the motor increases.

DETAILED DESCRIPTION

Embodiments of the present disclosure will now be described in detail with reference to the accompanying drawings.

Figure 1:
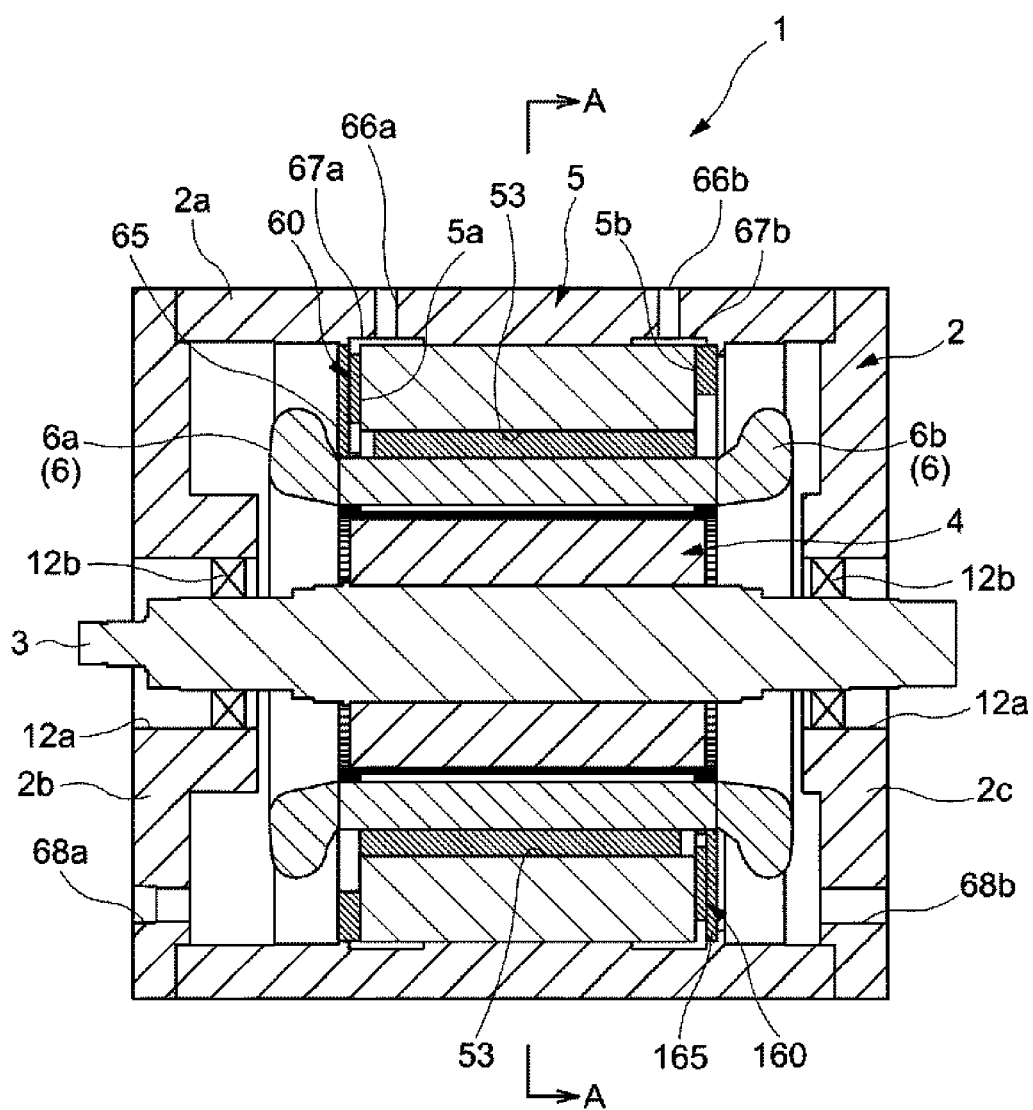
FIG. 1 is a vertical sectional view of a motor according to an embodiment of the present disclosure.
Figure 2A:
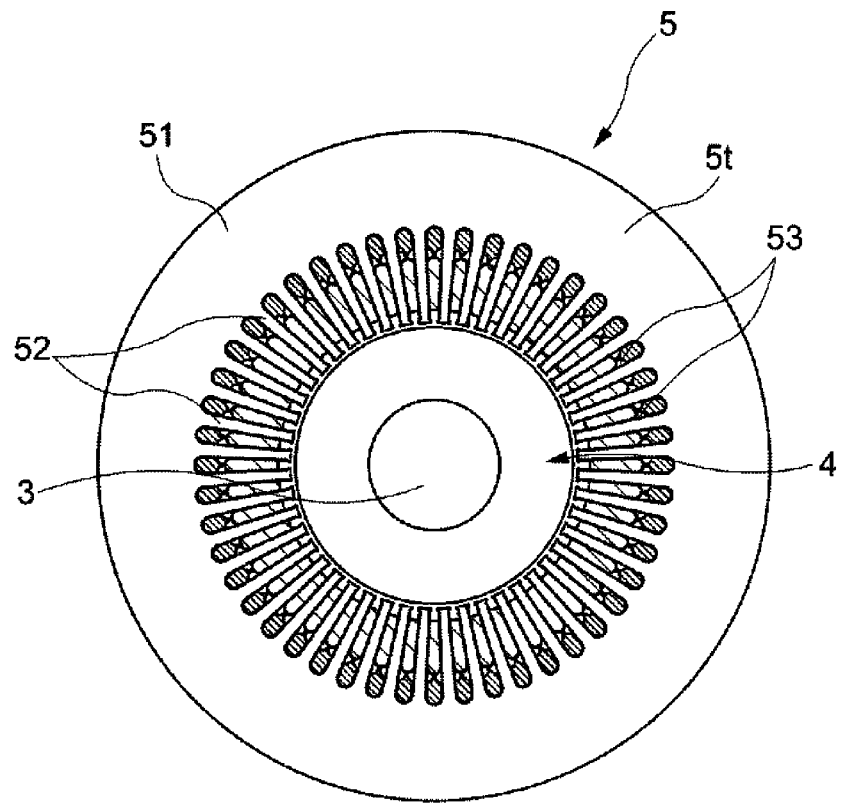
FIG. 2A is a sectional view of a stator and a rotor taken along line A-A in FIG. 1.
Figure 2B:
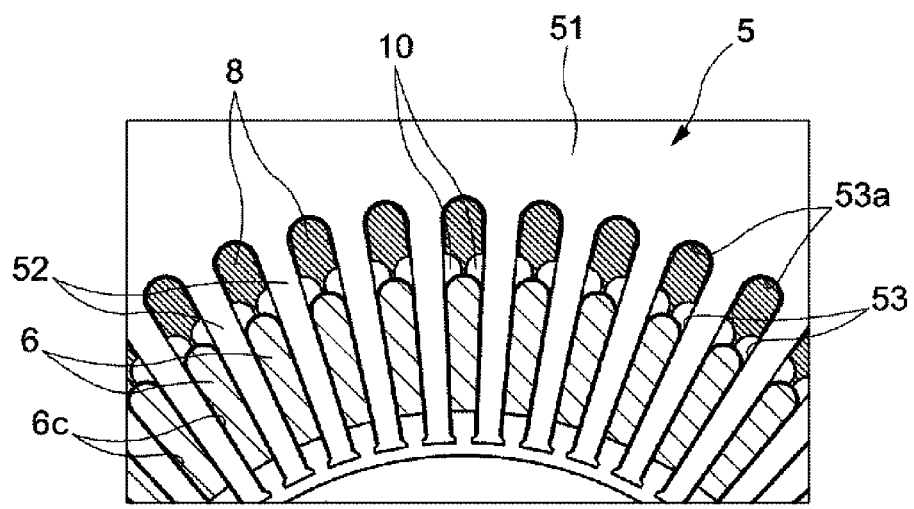
FIG. 2B is an enlarged view of a part of FIG. 2A.

As shown in FIGS. 1, 2A and 2B, the motor 1 includes a housing 2. Inside the housing 2, the motor 1 includes a rotor 4 configured to rotate about an axis of a motor shaft 3 which is a rotating shaft, and a stator 5 fixed to the housing 2 with a narrow gap (air gap) left between the rotor 4 and the stator 5 so as to surround the outer periphery of the rotor 4. Since the rotor 4 may be a well-known rotor, detailed description thereof will be omitted.

The motor 1 is used as a load device (dynamometer) for giving an accurate load to a motor or an engine-imitating dynamo device (dynamometer) which is one of the vehicle test devices, in order to perform a performance characteristic test of a motor mounted on a hybrid vehicle or an electric vehicle. In addition, the motor 1 may be used as a motor mounted on a hybrid vehicle, an electric vehicle or the like, or may be used for other purposes.

As shown in FIGS. 2A and 2B, the stator 5 includes a plurality of laminated plates 5t laminated in the axial direction thereof, and includes an annular yoke 51 located on the outside of the stator 5 and a plurality of teeth 52 protruding toward the motor shaft 3 from the inner peripheral surface of the yoke 51. The gaps between the teeth 52 that are adjacently arranged are referred to as slots 53 whose number is the same as the number of teeth 52.

Coil 6 wound around the teeth 52 are arranged in the slots 53 formed between the adjacent teeth 52. In the slots 53, the peripheries of the coils 6 are covered with an insulating paper 6c, and wedges (not shown) are arranged at the inner end portions of the slots 53. In the present embodiment, the coils 6 may refer to coils including an insulating paper 6c that covers the peripheries thereof.

Figure 3A:
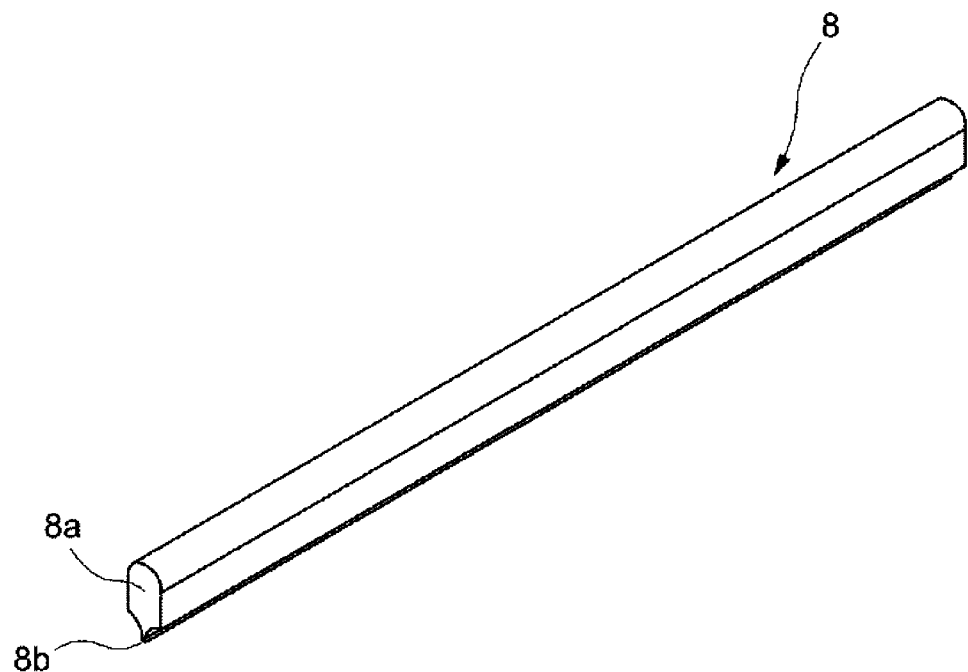
FIG. 3A is a perspective view of a spacer.

In the slots 53, the spacers 8 are arranged in the vicinity of the bottom portions 53a. The spacers 8 are members for positioning the coils 6 in the slots 53. As shown in FIG. 3A, the spacers 8 are long members and have substantially the same length as the length of the stator 5. Each of the spacers 8 includes a main body portion 8a and a protruding portion 8b protruding from the main body portion 8a.

When the spacer 8 is inserted into the slot 53, the main body portion 8a is arranged on the outer peripheral side of the stator 5, and the protruding portion 8b is arranged on the inner peripheral side of the stator 5. That is, the main body portion 8a is arranged in the vicinity of the bottom portion 53a of the slot 53, and the protruding portion 8b is arranged in the vicinity of the coil 6 in the slot 53.

The outer peripheral surface of the main body portion 8a of the spacer 8 has substantially the same shape as the vicinity of the bottom portion 53a of the slot 53 of the stator 5. Therefore, when the spacer 8 is inserted into the slot 53, almost no gap is formed between the outer peripheral surface of the main body portion 8a and the vicinity of the bottom portion 53a of the slot 53.

Figure 3B:
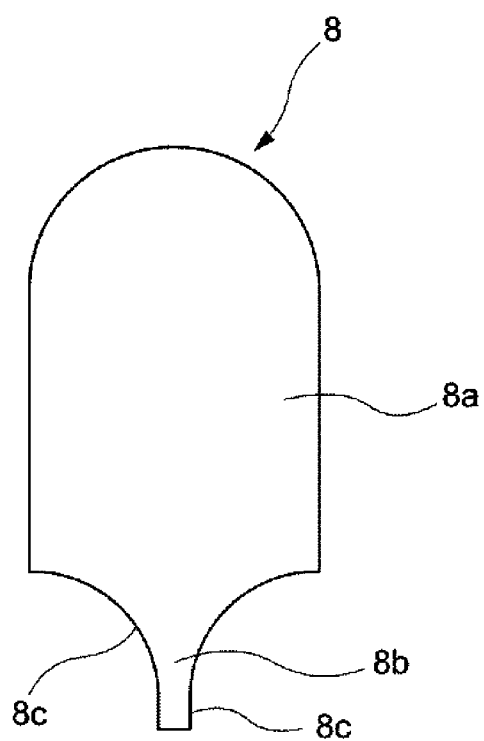
FIG. 3B is a sectional view of the spacer.
Figure 4:
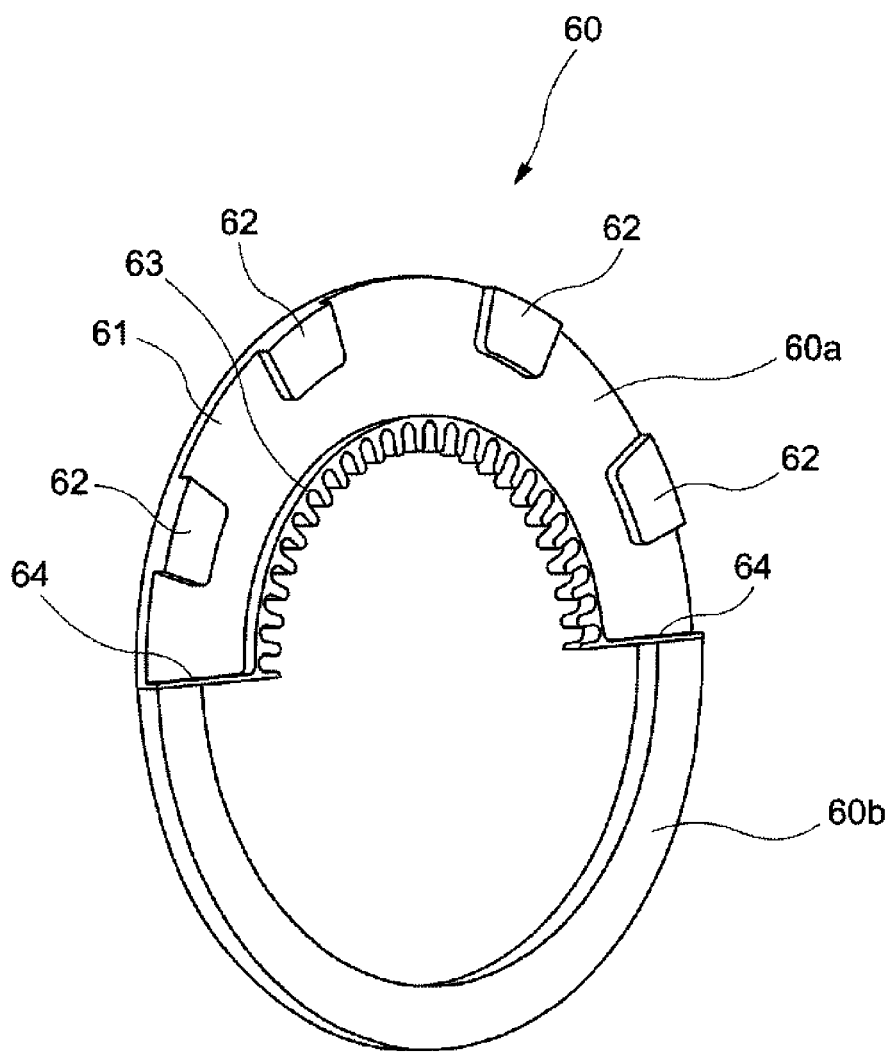
FIG. 4 is a perspective view of an end plate member.
Figure 5A:
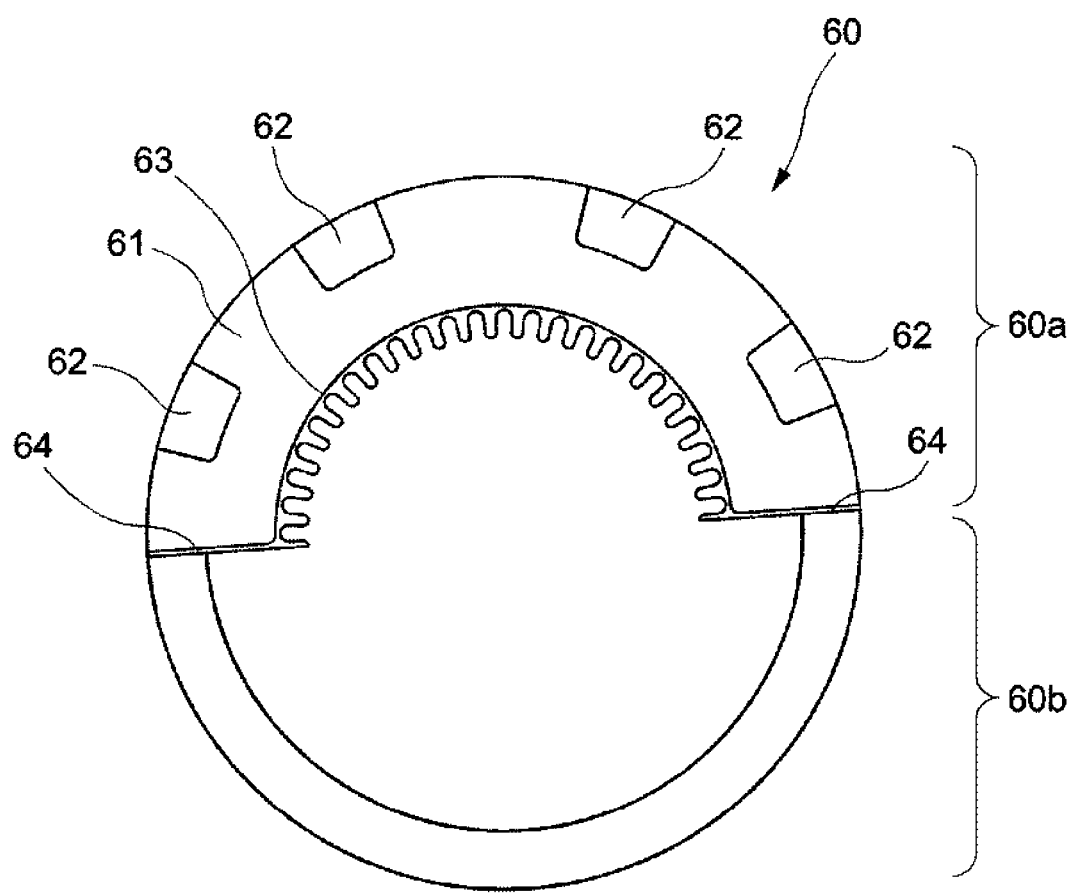
FIG. 5A is a view showing the inner surface of the end plate member shown in FIG. 4.
Figure 5B:
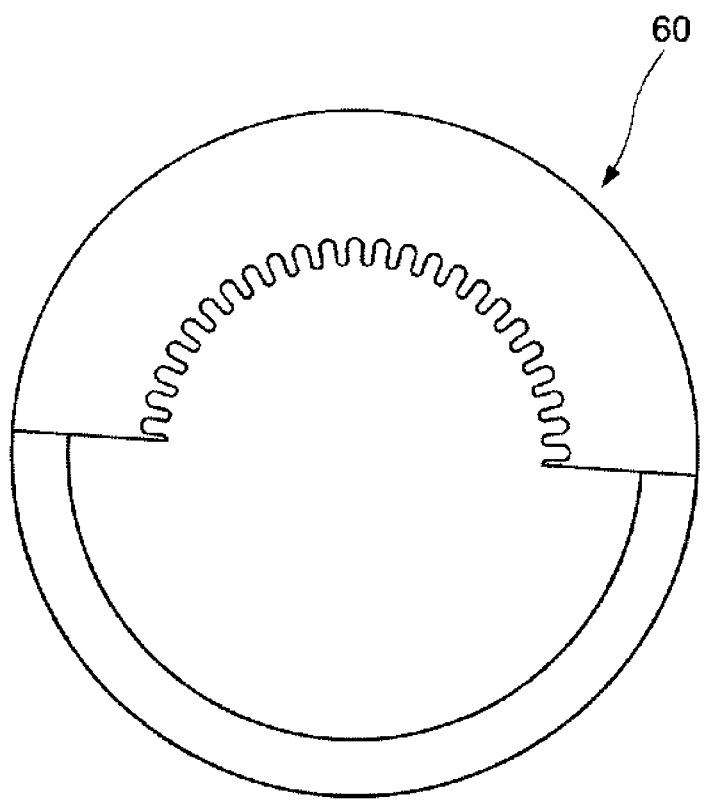
FIG. 5B is a view showing the outer surface of the end plate member shown in FIG. 4.

The protruding portion 8b protrudes from the main body portion 8a toward the coil 6 in the slot 53. As shown in FIG. 3B, the protruding portion 8b has a maximum protrusion amount at the center in the width direction. The protrusion amount decreases as the protruding portion 8b comes close to the end portions in the width direction from the center in the width direction. The side surface of the protruding portion 8b is formed in an inwardly convex curved surface shape. The main body portion 8a and the protruding portion 8b of the spacer 8 have the same cross-sectional shape over the entire length thereof. The tip of the protruding portion 8b is in contact with the coil 6.

As shown in FIG. 2B, a gap 10 to which a cooling medium is supplied is formed between the spacer 8 and the coil 6 (between the bottom portion 53a of the slot 53 and the coil 6). As described above, the protruding portion 8b of the spacer 8 has the maximum protrusion amount at the center in the width direction, and the tip of the protruding portion 8b is in contact with the coil 6. Therefore, two gaps 10 are formed in one slot 53. That is, the spacer 8 includes two recess portions 8c for forming two gaps 10 in one slot 53. The two recess portions 8c are formed over the entire length of the spacer 8.

An end plate member 60 is attached to one end surface 5a (left end surface in FIG. 1) of the stator 5, and an end plate member 160 is attached to the other end surface 5b (right end surface in FIG. 1) of the stator 5. Since the end plate member 60 and the end plate member 160 have the same shape, the end plate members 60 and 160 having the same shape are attached to the one end surface 5a and the other end surface 5b of the stator 5, respectively. The shape of the end plate member 60 will be described. Since the shape of the end plate member 160 is the same as the shape of the end plate member 60, the description thereof will be omitted.

The end plate member 60 is an annular plate-shaped member. The diameter of the outer peripheral portion of the end plate member 60 is substantially the same as the outer diameter of the stator 5. The end plate member 60 includes a first portion 60a arranged above a horizontal line passing through the center of the end plate member 60 when the end plate member 60 is attached to one end surface 5a of the stator 5, and a second portion 60b arranged below the horizontal line passing through the center of the end plate member 60.

The first portion 60a of the end plate member 60 is a portion having a first predetermined width (width along the radial direction) and arranged along the circumferential direction. The second portion 60b is a portion having a second predetermined width (width along the radial direction) and arranged along the circumferential direction. The first predetermined width of the first portion 60a is substantially the same width over the entire first portion 60a, and the second predetermined width of the second portion 60b is substantially the same width over the entire second portion 60b. The first predetermined width of the first portion 60a is larger than the second predetermined width of the second portion 60b. In a state where the end plate member 60 is attached to one end surface 5a of the stator 5, the inner peripheral portion of the first portion 60a is arranged so as to face the intermediate portion of each of the teeth 52 of the stator 5. The width of the second portion 60b is substantially the same as the width of the yoke 51 of the stator 5.

On the inner surface 61 (the surface on the side of the stator 5) of the first portion 60a of the end plate member 60, there are formed four rectangular convex portions 62 arranged on the outer peripheral portion thereof, a curved convex portion 63 arranged on the inner peripheral portion thereof, and two linear convex portions 64 arranged at the lower end portion thereof. The convex portions 62, the convex portion 63 and the convex portions 64 are spaced apart from one another. On the inner surface 61 of the first portion 60a, the portions other than the convex portions 62, 63 and 64 are formed in a concave shape with respect to the tip surfaces of the convex portions 62, 63 and 64. Therefore, the cooling medium is supplied from between the adjacent convex portions 62 on the outer peripheral portion of the first portion 60a and between the convex portion 62 and the convex portion 64 toward the inner peripheral portion of the first portion 60a. Since the thickness of the second portion 60b is the same as the thickness of the convex portions 62 and 64 of the first portion 60a, the cooling medium is not supplied from the outer peripheral portion of the second portion 60b to the inner peripheral portion of the second portion 60b.

Therefore, in a state in which the end plate member 60 is attached to the one end surface 5a of the stator 5, a cooling medium supply path 65 having a shape corresponding to the portion of the inner surface 61 other than the convex portions 62, 63 and 64 is formed between the inner surface 61 of the end plate member 60 and the one end surface 5a of the stator 5. The cooling medium supply path 65 communicates with a plurality of slots 53 (hereinafter referred to as a plurality of slots 53 on the upper side of the stator 5) arranged above the horizontal line passing through the center of the stator 5. The cooling medium supply path 65 supplies a cooling medium to the plurality of slots 53.

The end plate member 160 having the same shape as the end plate member 60 attached to one end surface 5a of the stator 5 is attached to the other end surface 5b of the stator 5. However, the attachment method of the end plate member 160 is different the attachment method of the end plate member 60. The end plate member 160 is vertically opposite to the end plate member 60 with respect to the other end surface 5b of the stator 5. The end plate member 160 is attached so that the inner surface 61 of the end plate member 160 is arranged on the other end surface 5b side of the stator 5.

Therefore, in a state in which the end plate member 160 is attached to the other end surface 5b of the stator 5, a cooling medium supply path 165 having a shape corresponding to the portion of the inner surface 61 other than the convex portions 62, 63 and 64 is formed between the inner surface 61 of the end plate member 160 and the other end surface 5b of the stator 5. The cooling medium supply path 165 communicates with a plurality of slots 53 (hereinafter referred to as a plurality of slots 53 on the lower side of the stator 5) arranged below the horizontal line passing through the center of the stator 5. The cooling medium supply path 165 supplies a cooling medium to the plurality of slots 53.

In the present embodiment, the number of the plurality of slots 53 (the plurality of first slots) on the upper side of the stator 5 and the number of the plurality of slots 53 (the plurality of second slots) on the lower side of the stator 5 are the same.

Figure 6:
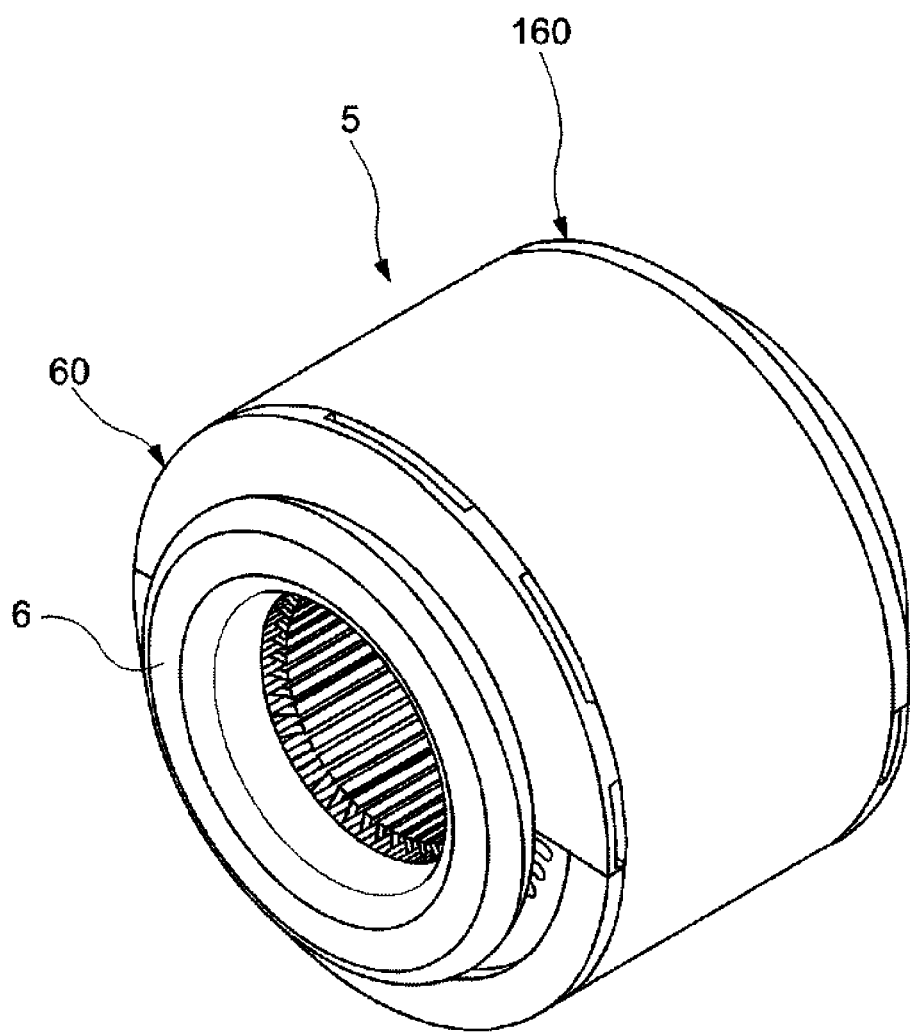
FIG. 6 is a perspective view of the stator.
Figure 7:
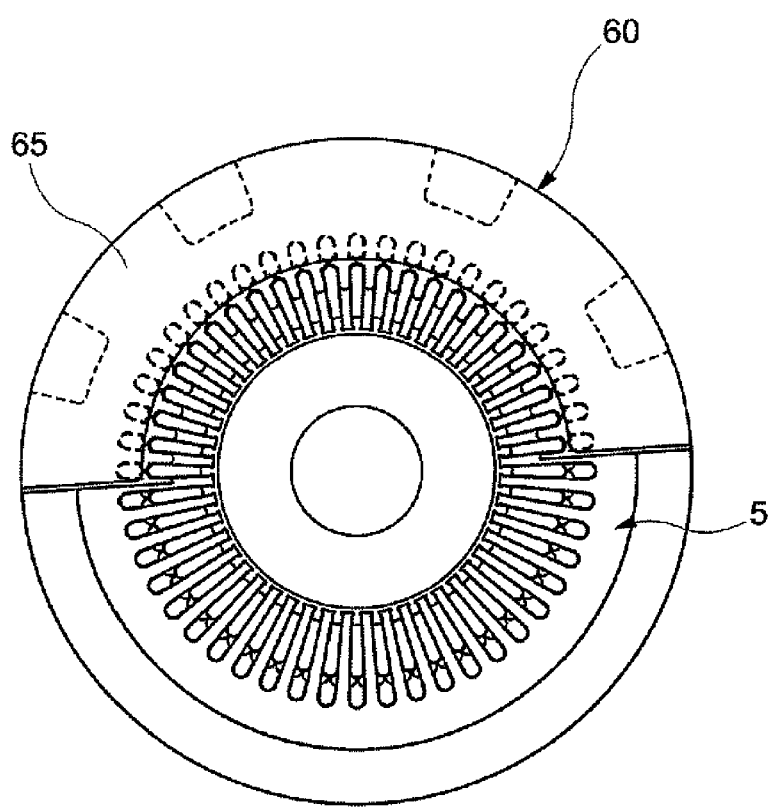
FIG. 7 is a view of the stator as viewed from one end side.
Figure 8:
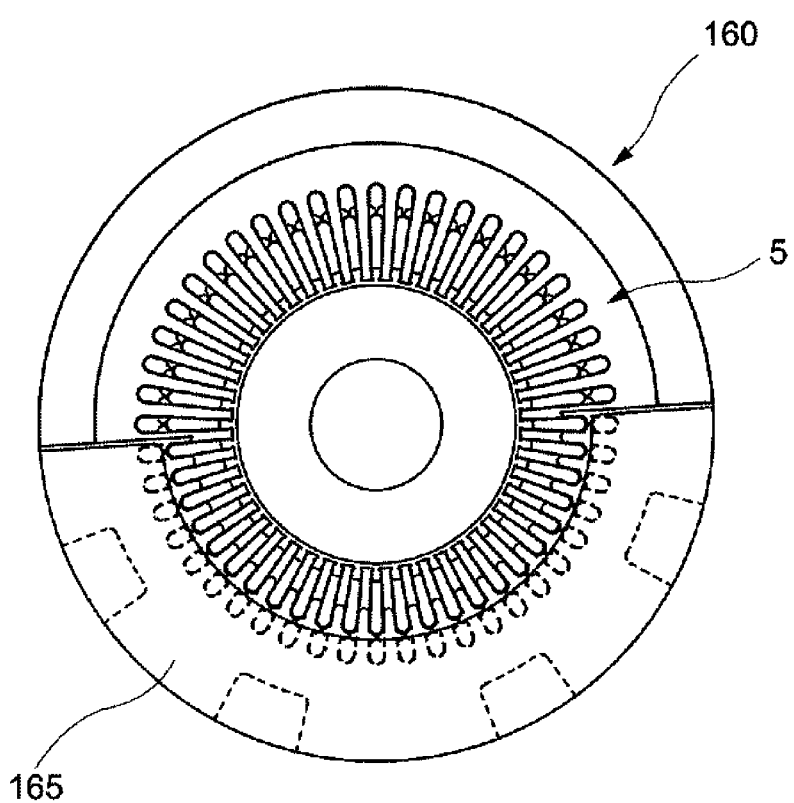
FIG. 8 is a view of the stator as viewed from the other end side.

As shown in FIG. 6, the end plate member 60 is attached to one end surface 5a of the stator 5, and the end plate member 160 is attached to the other end surface 5b of the stator 5. FIG. 7 is a view of the stator 5 of FIG. 6 as viewed from one end side, and FIG. 8 is a view of the stator 5 of FIG. 6 as viewed from the other end side. The coil ends are not shown in FIGS. 7 and 8.

One end portion (left end portion in FIG. 1) of each of the gaps 10 in the plurality of slots 53 on the upper side of the stator 5 communicates with the cooling medium supply path 65 as shown in FIG. 7. The other end portion (right end portion in FIG. 1) of each of the gaps 10 in the plurality of slots 53 on the upper side of the stator 5 is opened as shown in FIG. 8. Further, one end portion (right end portion in FIG. 1) of each of the gaps 10 in the plurality of slots 53 on the lower side of the stator 5 communicates with the cooling medium supply path 165 as shown in FIG. 8. The other end portion (left end portion in FIG. 1) of each of the gaps 10 in the plurality of slots 53 on the lower side of the stator 5 is opened as shown in FIG. 7.

As shown in FIG. 1, the coils 6 are wound around the teeth 52 so as to pass through the slots 53. The coil end 6a including one end portion (left end portion in FIG. 1) of the coil 6 is arranged on the oppose side of the end plate member 60 from the stator 5, and the coil end 6b including the other end portion (right end portion in FIG. 1) of the coil 6 is arranged on the oppose side of the end plate member 160 from the stator 5. That is, on one end side of the stator 5, the coil end 6a protrudes from the end plate member 60, and on the other end side of the stator 5, the coil end 6b protrudes from the end plate member 160.

As shown in FIG. 1, the housing 2 includes a cylindrical member 2a, a disk portion 2b arranged at one end portion of the cylindrical member 2a, and a disk portion 2c arranged at the other end portion of the cylindrical member 2a. A hole portion 12a is formed in each of the disk portion 2b and the disk portion 2c. A bearing portion 12b that rotatably supports the motor shaft 3 is arranged in the hole portion 12a.

Two supply holes 66a and 66b are formed on the upper portion of the cylindrical member 2a of the housing 2. The supply hole 66a is formed outside the vicinity of one end surface 5a of the stator 5, and the supply hole 66b is formed outside the vicinity of the other end surface 5b of the stator 5. The supply holes 66a and 66b are connected to a cooling medium supply device (not shown). When cooling the coils 6 in the slots 53, the cooling medium is supplied from the cooling medium supply device to the two supply holes 66a and 66b.

A groove portion 67a communicating with the supply hole 66a and a groove portion 67b communicating with the supply hole 66b are formed on the inner peripheral surface of the cylindrical member 2a. The outer peripheral surface of the stator 5 is attached to the inner peripheral surface of the cylindrical member 2a. One end surface 5a of the stator 5 faces the groove portion 67a, and the other end surface 5b of the stator 5 faces the groove portion 67b. The groove portions 67a and 67b are formed over the entire circumference of the inner peripheral surface of the cylindrical member 2a.

Figure 9:
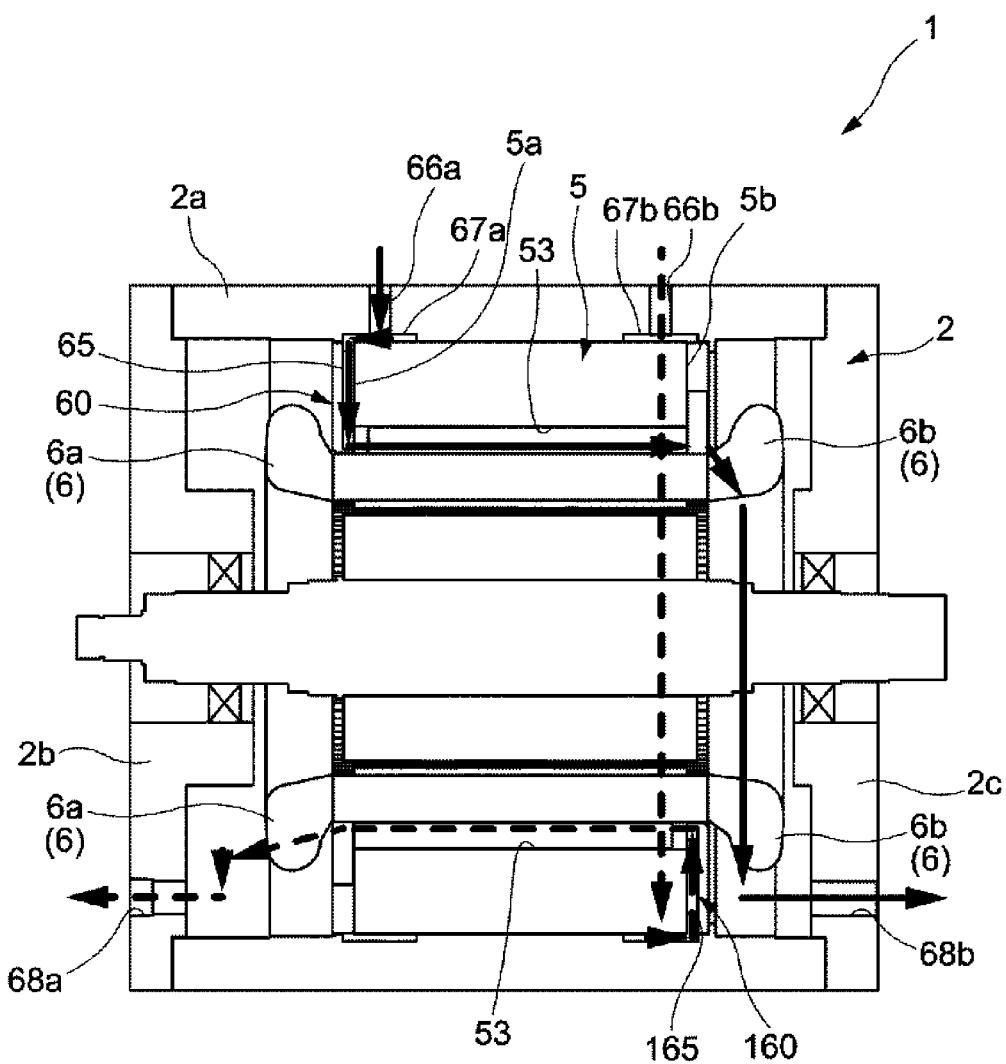
FIG. 9 is a view showing a moving direction of a cooling medium in the housing shown in FIG. 1.

As described above, a cooling medium supply path 65 is formed between the end plate member 60 and one end surface 5a of the stator 5. The groove portion 67a formed on the inner peripheral surface of the cylindrical member 2a communicates with the cooling medium supply path 65. Therefore, as shown in FIG. 9, when the cooling medium is supplied from the cooling medium supply device to the supply hole 66a of the housing 2, the cooling medium passes through the groove portion 67a of the cylindrical member 2a and flows into the cooling medium supply path 65.

Thereafter, the cooling medium in the cooling medium supply path 65 is supplied to the gaps 10 in the plurality of slots 53 on the upper side of the stator 5 (in the plurality of slots 53 on the other end side of the stator 5 with respect to the cooling medium supply path 65). The cooling medium that has passed through the gaps 10 flows out from the other end surface 5b of the stator 5 into the housing 2. Thereafter, the outflowing cooling medium is moved downward in the housing 2 by gravity, and is discharged to the outside of the housing 2 from a discharge portion 68b formed in the disk portion 2c. The outflowing cooling medium cools the coil end 6b by making contact with the coil end 6b when moving downward in the housing 2 by gravity.

The cooling medium supply path 165 is formed between the end plate member 160 and the other end surface 5b of the stator 5. The groove portion 67b formed on the inner peripheral surface of the cylindrical member 2a communicates with the cooling medium supply path 65b. Therefore, when the cooling medium is supplied from the cooling medium supply device to the supply hole 66b of the housing 2, the cooling medium passes through the groove portion 67b of the cylindrical member 2a and flows into the cooling medium supply path 165.

Thereafter, the cooling medium in the cooling medium supply path 165 is supplied to the gaps 10 in the plurality of slots 53 on the lower side of the stator 5 (in the plurality of slots 53 on one end side of the stator 5 from the cooling medium supply path 65). The cooling medium that has passed through the gaps 10 flows out from one end surface 5a of the stator 5 into the housing 2. Thereafter, the outflowing cooling medium is moved downward in the housing 2 by gravity, and is discharged to the outside of the housing 2 from a discharge portion 68a formed in the disk portion 2b. The outflowing cooling medium cools the coil end 6a by making contact with the coil end 6a when moving downward in the housing 2 by gravity.

As described above, in the motor 1, the cooling medium passes through the gaps 10 in the plurality of slots 53 on the upper side of the stator 5 from one end surface 5a toward the other end surface 5b of the stator 5, whereas the cooling medium passes through the gaps 10 in the plurality of slots 53 on the lower side of the stator 5 from the other end surface 5b toward one end surface 5a of the stator 5. That is, the direction in which the cooling medium flows is opposite between the gaps 10 in the plurality of slots 53 on the upper side of the stator 5 and the gaps 10 in the plurality of slots 53 on the lower side of the stator 5.

Further, the cooling medium in the cooling medium supply path 65 flows toward the other end surface 5b of the stator 5 and then flows out from the other end surface 5b of the stator 5. The cooling medium in the cooling medium supply path 165 flows toward one end surface 5a of the stator 5 and then flows out from one end surface 5a of the stator 5. That is, on one end side of the stator 5, the cooling medium flows out from the plurality of slots 53 on the upper side of the stator 5. On the other end side of the stator 5, the cooling medium flows out from the plurality of slots 53 on the lower side of the stator 5. Therefore, the number of slots 53 from which the cooling medium flows out on one end surface 5a of the stator 5 is the same as the number of slots 53 from which the cooling medium flows out on the other end surface 5b of the stator 5.

The present disclosure may include a motor in which the cooling medium passes through all of the gaps 10 in the plurality of slots 53 of the stator 5 in one direction. However, in that case, in all of the plurality of slots 53, a temperature difference is generated between the inflow side and the outflow side of the cooling medium, and temperature unevenness is formed in the coils 6 in the axial direction of the stator 5. On the other hand, in the motor 1 of the present embodiment, the gaps 10 in the plurality of slots 53 include the gaps 10 through which the cooling medium passes in one direction and the gaps 10 through which the cooling medium passes in the other direction. Therefore, it is possible to suppress the formation of temperature unevenness in the coils 6 in the axial direction of the stator 5.

As described above, the motor 1 of the present embodiment includes: a stator 5 including a plurality of laminated plates St; and a rotor 4 arranged inside the stator 5 with a gap left therebetween, wherein the stator 5 includes an annular yoke 51 located outside and a plurality of teeth 52 protruding from an inner peripheral surface of the yoke 51 toward the rotor 4, slots 53 in which coils 6 wound around the teeth 52 are arranged are formed between the adjacent teeth 52, gaps 10 to which a cooling medium is supplied are formed between bottom portions 53a of the slots 53 and the coils 6, the stator 5 includes end plate members 60 and 160 arranged so as to face the laminated plates 5t, one end portion of the gap 10 in at least one of the slots 53 communicates with cooling medium supply paths 65 and 165 respectively formed between the end plate members 60 and 160 and the laminated plates 5t of the stator 5, while the other end portion of the gap 10 in at least one of the slots 53 is opened.

Thus, according to the present disclosure, the cooling medium is supplied to the gap 10 in at least one of the slots 53 from the cooling medium supply paths 65 and 165 respectively formed between the end plate members 60 and 160 and the laminated plates 5t of the stator 5. Therefore, the coils 6 in the slots 53 are cooled by the cooling medium passing through the gaps 10 in the slots 53. Accordingly, it is possible to effectively suppress the temperature rise in the central portions of the coils 6 in the slots 53 which have the highest temperature. Further, the coil ends 6a and 6b are cooled as the cooling medium passing through the gap 10 in at least one of the slots 53 makes contact with the coil ends 6a and 6b. Accordingly, even when the loss density of the motor 1 increases, it is possible to prevent the temperature rise of the coils 6 from exceeding a specified value.

In this case, the cooling medium supply paths include a cooling medium supply path 65 arranged on one end side of the stator 5 and configured to supply the cooling medium to the slots 53 arranged on the other end side of the stator 5, and a cooling medium supply path 165 arranged on the other end side of the stator 5 and configured to supply the cooling medium to the slots 53 arranged on one end side of the stator 5, and the cooling medium in the cooling medium supply path 65 flows toward the other end surface 5b of the stator 5 and then flows out from the other end surface 5b of the stator 5, and the cooling medium in the cooling medium supply path 165 flows toward one end surface 5a of the stator 5 and then flows out from one end surface 5a of the stator 5.

In this way, the cooling medium in the cooling medium supply path 65 flows from one end surface 5a of the stator 5 toward the other end surface 5b, and the cooling medium in the cooling medium supply path 165 flows from the other end surface 5b of the stator 5 toward one end surface 5a. Therefore, as compared with the case where the entire cooling medium flows in the same direction, the temperature of the coils 6 can be made uniform in the axial direction of the stator 5. Further, as compared with the case where the entire cooling medium passed through the slots 53 flows out toward one side of the stator 5, it is possible to reduce a difference between the amount of the cooling medium flowing out from one end surface 5a of the stator 5 and the amount of the cooling medium flowing out from the other end surface 5b of the stator 5. Therefore, it is possible to easily recover the cooling medium flowing out from the stator 5.

In the motor 1, the number of the slots 53 from which the cooling medium flows out on the other end surface 5b of the stator 5 is the same as the number of the slots 53 from which the cooling medium flows out on one end surface 5a of the stator 5.

As a result, the cooling occurring when the cooling medium in the cooling medium supply path 65 flows from one end surface 5a toward the other end surface 5b of the stator 5, and the cooling occurring when the cooling medium in the cooling medium supply path 165 flows from the other end surface 5b toward one end surface 5a of the stator 5 are substantially the same. Therefore, the temperature of the coils 6 can be made more uniform in the axial direction of the stator 5. Further, the amount of the cooling medium flowing out from one end surface 5a of the stator 5 and the amount of the cooling medium flowing out from the other end surface 5b of the stator 5 can be made substantially the same.

The motor 1 further includes: an end plate member 60 arranged on one end surface 5a of the stator 5; and an end plate member 160 arranged on the other end surface 5b of the stator 5, wherein the coils 6 include coil ends 6a arranged on the opposite side of the end plate member 60 from the stator 5, and coil ends 6b arranged on the opposite side of the end plate member 160 from the stator 5.

As a result, the stator 5 can be made small in size as compared with the case where the cooling medium supply paths are formed so as to cover the entirety up to the coil ends 6a and 6b.

Further, in the motor 1, spacers 8 configured to position the coils 6 in the slots 53 are arranged in the vicinity of the bottom portions 53a in the plurality of slots 53, and the spacers 8 include recess portions 8c for forming the gaps 10 in the slots 53.

As a result, it is possible to prevent the coils 6 from moving in the slots 53 and to prevent the magnetic characteristics from being changed.

The specific configuration is not limited to the above-described embodiment.

As a result, it is possible to prevent the coils 6 from moving in the slots 53 and to prevent the magnetic characteristics from being changed.

In the above-described embodiment, the stator 5 includes the end plate member 60 arranged on one end surface 5a of the stator 5 and the end plate member 160 arranged on the other end surface 5b of the stator 5. Alternatively, the stator 5 may include one of the end plate member 60 arranged on one end surface 5a of the stator 5 and the end plate member 160 arranged on the other end surface 5b of the stator 5.

In the above-described embodiment, the slots 53 of the stator 5 are divided into two groups, and the directions in which the cooling medium passes through the gaps 10 in the slots 53 are opposite between the two groups. However, the present disclosure is not limited thereto. The slots 53 of the stator 5 may be divided into groups of even number larger than 2, and the directions in which the cooling medium passes through the gaps 10 in the slots 53 may be opposite between the half of the groups of even number and the remaining group. Also in this case, the effects of the present disclosure may be obtained.

In the above-described embodiment, the number of the slots 53 from which the cooling medium flows out on one end surface 5a of the stator 5 and the number of the slots 53 from which the cooling medium flows out on the other end surface 5b of the stator 5 are the same. However, the present disclosure is not limited thereto. The number of the slots 53 from which the cooling medium flows out on one end surface 5a of the stator 5 and the number of the slots 53 from which the cooling medium flows out on the other end surface 5b of the stator 5 may be different from each other.

In the above-described embodiment, the spacers 8 are arranged in the slots 53 of the stator 5. However, the spacers 8 may not be arranged in the slots 53.

In the above-described embodiment, the spacers 8 are arranged in the slots 53 of the stator 5, and two recess portions 8c are formed in each of the spacers 8, so that two gaps 10 are formed in one slot 53. However, the number of gaps 10 formed in one slot 53 is not limited thereto.

In the above-described embodiment, the end plate members 60 and 160 are arranged on the end surfaces of the stator 5. However, an end plate member 60A may be arranged between laminated plates St of a stator 5A.

Figure 10:
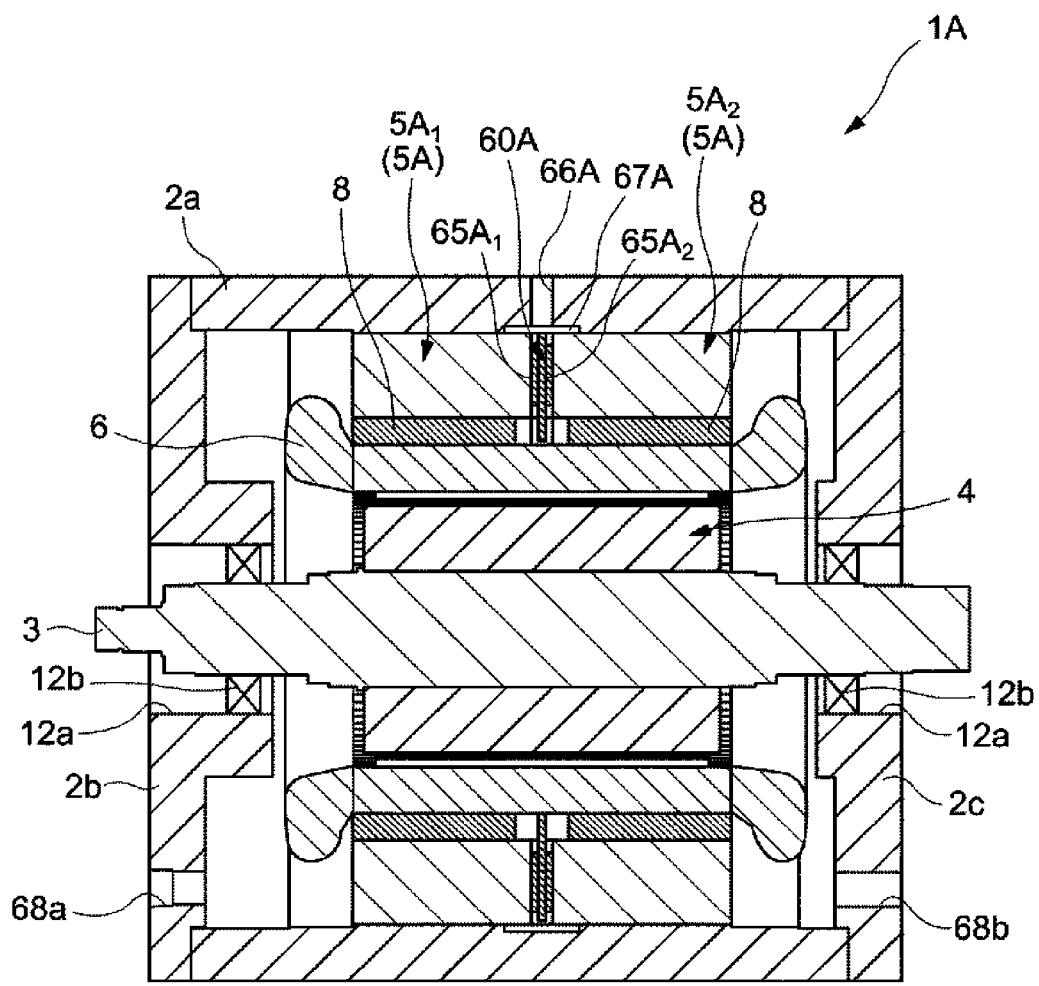
FIG. 10 is a vertical sectional view of a motor according to a modification of the present disclosure.
Figure 11A:
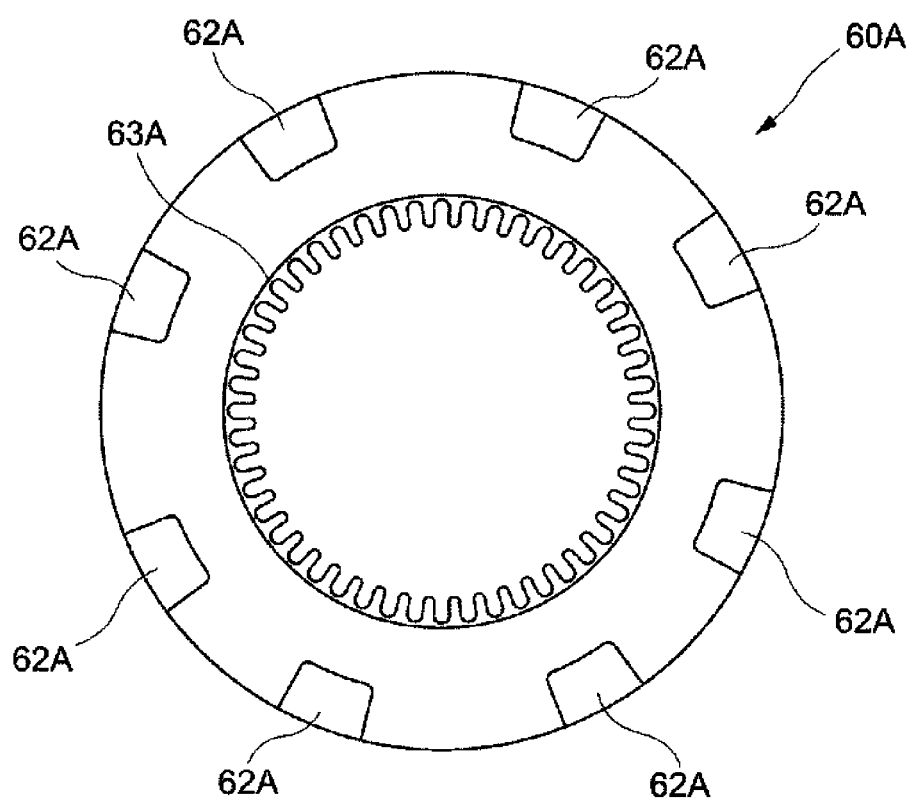
FIG. 11A is a plan view of the left end surface of the end plate member.
Figure 11B:
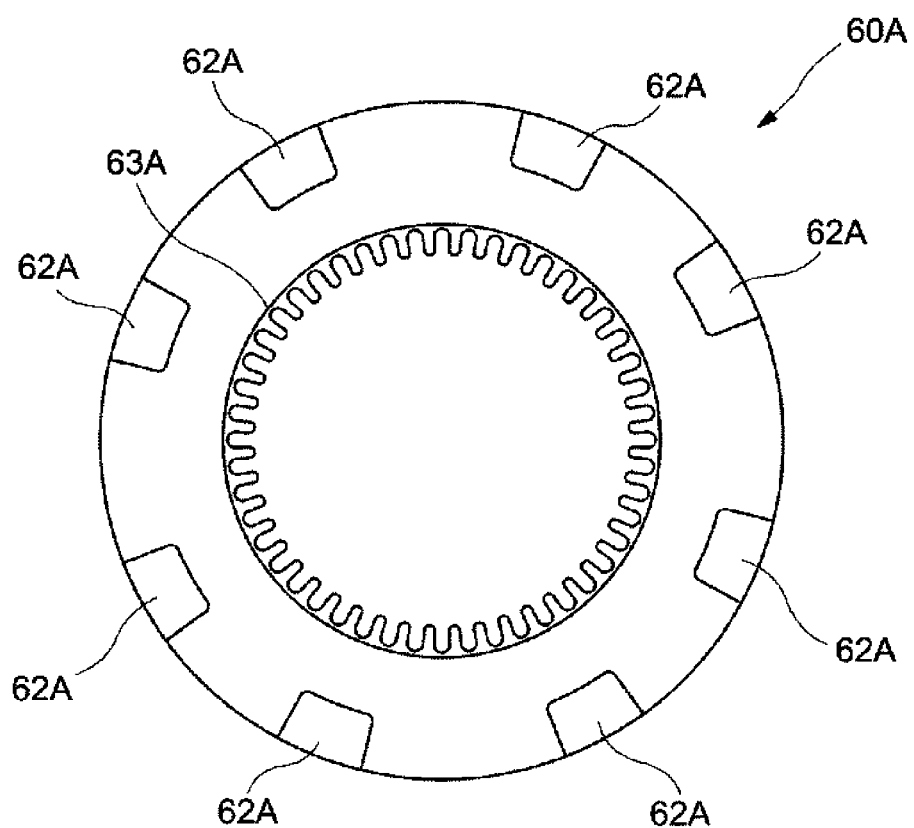
FIG. 11B is a plan view of the right end surface of the end plate member.
Figure 12:
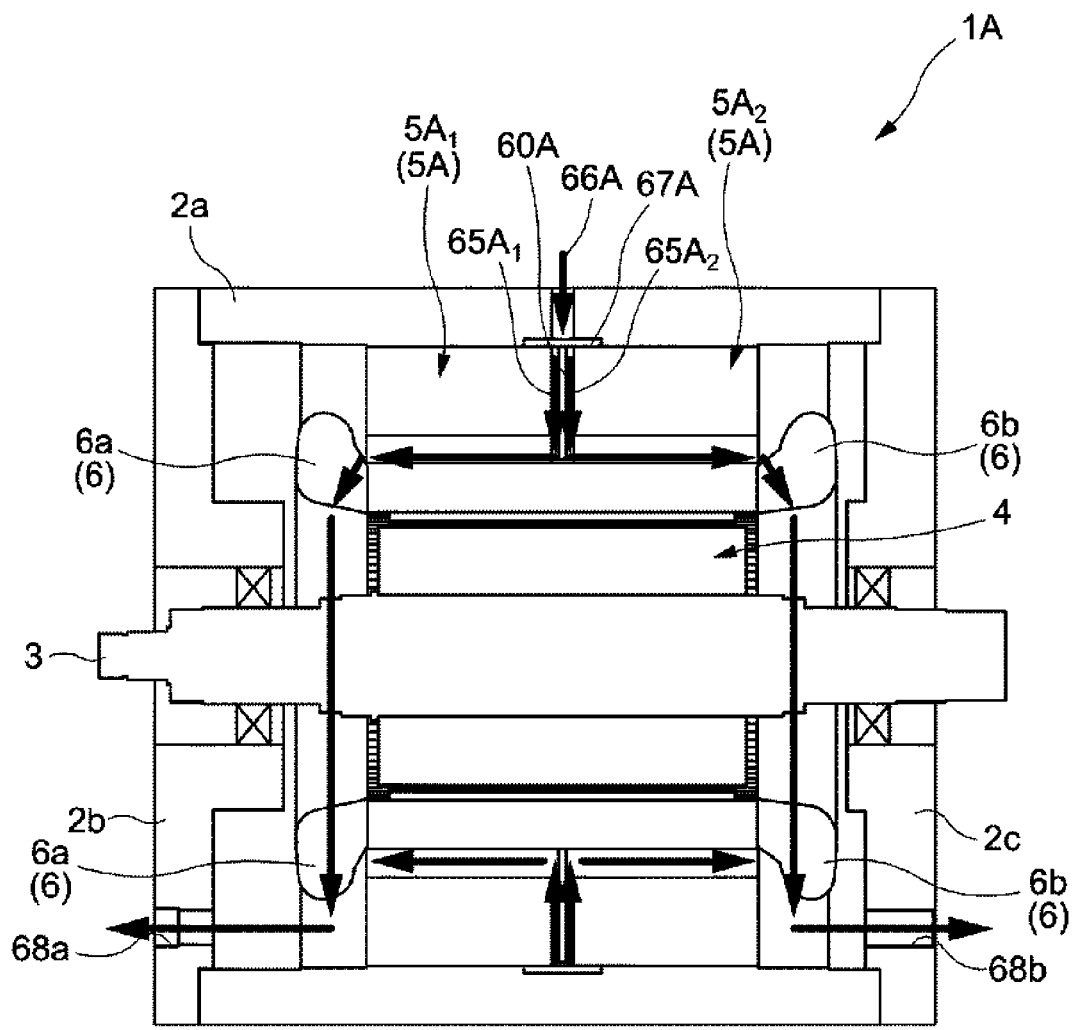
FIG. 12 is a view showing a moving direction of a cooling medium in the housing shown in FIG. 10.

In the motor 1A, as shown in FIG. 10, the stator 5A includes a plurality of laminated plates St laminated in the axial direction thereof. An end plate member 60A is arranged at the center of the plurality of laminated plates St. The stator 5A includes a stator portion $5A_1$ arranged on the left side of the end plate member 60A and a stator portion $5A_2$ arranged on the right side of the end plate member 60A. FIG. 11A is a plan view of the left end surface of the end plate member 60A, and FIG. 11B is a plan view of the right end surface of the end plate member 60A. On both surfaces of the end plate member 60A (the surfaces facing the laminated plates St of the stator 5), eight rectangular convex portions 62A arranged on the outer peripheral portion thereof and a circular convex portion 63A arranged on the inner peripheral portion thereof are formed. The convex portions 62A and the convex portion 63A are arranged to be spaced apart from each other. Therefore, on both sides of the end plate member 60A, the portions other than the convex portions 62A and the convex portion 63A are formed to be concave with respect to the tip surfaces of the convex portions 62A and the convex portion 63A.

Therefore, when the end plate member 60A is arranged between the stator portion $5A_1$ and the stator portion $5A_2$, a cooling medium supply path $65A_1$ having a shape corresponding to the portion other than the convex portion 62A and the convex portion 63A is formed between the end plate member 60A and the stator portion $5A_1$. The cooling medium supply path $65A_1$ communicates with all of the plurality of slots 53 of the stator portion $5A_1$ to supply a cooling medium to the plurality of slots 53. One end portion (right end portion in FIG. 10) of each of the gaps 10 in all slots 53 of the stator portion $5A_1$ communicates with the cooling medium supply path $65A_1$, and the other end portion (the left end portion in FIG. 10) of each of the gaps 10 in all slots 53 is opened.

Further, a cooling medium supply path $65A_2$ having a shape corresponding to the portion other than the convex portion 62A and the convex portion 63A is formed between the end plate member 60A and the stator portion $5A_2$. The cooling medium supply path $65A_2$ communicates with all of the plurality of slots 53 of the stator portion $5A_2$ to supply a cooling medium to the plurality of slots 53. One end portion (left end portion in FIG. 10) of each of the gaps 10 in all slots 53 of the stator portion $5A_2$ communicates with the cooling medium supply path $65A_2$, and the other end portion (the right end portion in FIG. 10) of each of the gaps 10 in all slots 53 is opened.

One supply hole 66A is formed in the upper portion of the cylindrical member 2a of the housing 2. The supply hole 66A is formed on the outside of the central portion of the stator 5. The supply hole 66A is connected to a cooling medium supply device (not shown). When the coils 6 in the slots 53 are cooled, a cooling medium is supplied from the cooling medium supply device to the supply hole 66A.

A groove portion 67A communicating with the supply hole 66A is formed on the inner peripheral surface of the cylindrical member 2a. The outer peripheral surface of the stator 5A is attached to the inner peripheral surface of the cylindrical member 2a. The portion between the stator portion $5A_1$ and the stator portion $5A_2$ of the stator 5A faces the groove portion 67A. The groove portion 67A is formed over the entire circumference of the inner peripheral surface of the cylindrical member 2a.

As described above, the cooling medium supply path $65A_1$ is formed between the end plate member 60A and the stator portion $5A_1$, and the groove portion 67A formed on the inner peripheral surface of the cylindrical member 2a communicates with the cooling medium supply path $65A_1$. Therefore, when the cooling medium is supplied from the cooling medium supply device to the supply hole 66A of the housing 2, the cooling medium passes through the groove portion 67A of the cylindrical member 2a and is supplied into the cooling medium supply path $65A_1$.

Thereafter, the cooling medium in the cooling medium supply path $65A_1$ is supplied to the gaps 10 in all the slots 53 of the stator portion $5A_1$ (the plurality of slots 53 on one end side of the stator 5 from the cooling medium supply path $65A_1$). The cooling medium that has passed through the gaps 10 flows out from the stator portion $5A_1$ into the housing 2. Thereafter, the outflowing cooling medium is moved downward in the housing 2 by gravity, and is discharged to the outside of the housing 2 from the discharge portion 68a formed in the disk portion 2b. The outflowing cooling medium cools the coil ends 6a by making contact with the coil ends 6a when moving downward in the housing 2 by gravity.

Further, the cooling medium supply path $65A_2$ is formed between the end plate member 60A and the stator portion $5A_2$, and the groove portion 67A formed on the inner peripheral surface of the cylindrical member 2a communicates with the cooling medium supply path $65A_2$. Therefore, when the cooling medium is supplied from the cooling medium supply device to the supply hole 66A of the housing 2, the cooling medium passes through the groove portion 67A of the cylindrical member 2a and is supplied into the cooling medium supply path $65A_2$.

Thereafter, the cooling medium in the cooling medium supply path $65A_2$ is supplied to the gaps 10 in all the slots 53 of the stator portion $5A_2$ (the plurality of slots 53 on the other end side of the stator 5 from the cooling medium supply path $65A_2$). The cooling medium that has passed through the gaps 10 flows out from the stator portion $5A_2$ into the housing 2. Thereafter, the outflowing cooling medium is moved downward in the housing 2 by gravity, and is discharged to the outside of the housing 2 from the discharge portion 68b formed in the disk portion 2c. The outflowing cooling medium cools the coil ends 6b by making contact with the coil ends 6b when moving downward in the housing 2 by gravity.

As described above, in the motor 1A, the cooling medium passes through the gaps 10 in the slots 53 of the stator portion $5A_1$ from the center of the stator 5A toward one end side of the stator 5, whereas the cooling medium passes through the gaps 10 in the slots 53 of the stator portion $5A_2$ from the center of the stator 5A toward the other end side of the stator 5.

Further, the cooling medium in the cooling medium supply path $65A_1$ flows toward one end surface 5a of the stator 5 and then flows out from one end surface 5a of the stator 5. The cooling medium in the cooling medium supply path $65A_2$ flows toward the other end surface 5b of the stator 5 and then flows out from the other end surface 5b of the stator 5. That is, on one end side of the stator 5, the cooling medium flows out from all the slots 53 of the stator portion $5A_1$, and on the other end side of the stator 5, the cooling medium flows out from all the slots 53 of the stator portion $5A_2$. Therefore, the number of the slots 53 from which the cooling medium flows out on one end surface 5a of the stator 5 is the same as the number of the slots 53 from which the cooling medium flows out on the other end surface 5b of the stator 5.

EXPLANATION OF REFERENCE NUMERALS 1, 1A: motor, 4: rotor, 5, 5A: stator, 5t: laminated plate, 51: yoke, 52: teeth, 53: slot, 6: coil, 6a: one end of the coil, 6b: the other end of the coil, 8: spacer, 8c: recess portion, 10: gap, 60: end plate member (first end plate member), 60A: end plate member, 65: cooling medium supply path (first cooling medium supply path), $65A_1$, $65A_2$: cooling medium supply path, 160: end plate member (second end plate member), 165: cooling medium supply path (second cooling medium supply path)

What is claimed is:

1. A motor, comprising:
    a stator including a plurality of laminated plates; and
    a rotor arranged inside the stator with a gap between the rotor and the stator,
    wherein the stator further includes an annular yoke located outside of the stator and a plurality of teeth protruding from an inner peripheral surface of the yoke toward the rotor,
    wherein slots in which coils wound around the teeth are arranged are formed between the teeth that are adjacently arranged,
    wherein gaps to which a cooling medium is supplied are formed between bottom portions of the slots and the coils,
    wherein the stator further includes end plate members arranged so as to face the laminated plates, and
    wherein one end portion of the gaps in at least one of the slots communicates with cooling medium supply paths formed between the end plate members and the laminated plates of the stator, and the other end portion of the gaps in the at least one of the slots is opened.

2. The motor of claim 1, wherein the cooling medium supply paths include:
    a first cooling medium supply path arranged on one end surface of the stator and configured to supply a cooling medium to the slots arranged on the other end side of the stator; and
    a second cooling medium supply path arranged on the other end surface of the stator and configured to supply a cooling medium to the slots arranged on one end side of the stator, and
    wherein the cooling medium in the first cooling medium supply path flows toward the other end surface of the stator and then flows out from the other end surface of the stator, and
    wherein the cooling medium in the second cooling medium supply path flows toward the one end surface of the stator and then flows out from the one end surface of the stator.

3. The motor of claim 2, wherein a number of the slots from which the cooling medium flows out on the other end surface of the stator is the same as a number of the slots from which the cooling medium flows out on the one end surface of the stator.

4. The motor of claim 3, further comprising:
    a first end plate member arranged on one end surface of the stator; and
    a second end plate member arranged on the other end surface of the stator,
    wherein one end portions of the coils are arranged on an opposite side of the first end plate member from the stator, and the other end portions of the coils are arranged on an opposite side of the second end plate member from the stator.

5. The motor of claim 4, wherein spacers configured to position the coils in the slots are arranged in a vicinity of the bottom portions in the slots, and
    wherein the spacers include recess portions configured to form the gaps in the slots.

6. The motor of claim 3, wherein spacers configured to position the coils in the slots are arranged in a vicinity of the bottom portions in the slots, and
    wherein the spacers include recess portions configured to form the gaps in the slots.

7. The motor of claim 2, further comprising:
    a first end plate member arranged on one end surface of the stator; and
    a second end plate member arranged on the other end surface of the stator,
    wherein one end portions of the coils are arranged on an opposite side of the first end plate member from the stator, and the other end portions of the coils are arranged on an opposite side of the second end plate member from the stator.

8. The motor of claim 7, wherein spacers configured to position the coils in the slots are arranged in a vicinity of the bottom portions in the slots, and
    wherein the spacers include recess portions configured to form the gaps in the slots.

9. The motor of claim 2, wherein spacers configured to position the coils in the slots are arranged in a vicinity of the bottom portions in the slots, and
    wherein the spacers include recess portions configured to form the gaps in the slots.

10. The motor of claim 1, further comprising:
    a first end plate member arranged on one end surface of the stator; and
    a second end plate member arranged on the other end surface of the stator,
    wherein one end portions of the coils are arranged on an opposite side of the first end plate member from the stator, and the other end portions of the coils are arranged on an opposite side of the second end plate member from the stator.

11. The motor of claim 10, wherein spacers configured to position the coils in the slots are arranged in a vicinity of the bottom portions in the slots, and
    wherein the spacers include recess portions configured to form the gaps in the slots.

12. The motor of claim 1, wherein spacers configured to position the coils in the slots are arranged in a vicinity of the bottom portions in the slots, and
    wherein the spacers include recess portions configured to form the gaps in the slots.

* * * * *